(12) United States Patent
Mock et al.

(10) Patent No.: US 12,419,466 B2
(45) Date of Patent: Sep. 23, 2025

(54) STORAGE CADDY FOR A FOOD PROCESSOR ASSEMBLY

(71) Applicant: WHIRLPOOL CORPORATION, Benton Harbor, MI (US)

(72) Inventors: Brandon T. Mock, St. Joseph, MI (US); Yifan Wang, St. Joseph, MI (US); Emily A. Graham, Stevensville, MI (US); Chen Yu He, Haicheng Town (CN); Yu Bing Sheng, Yanji (CN); Zou Yun, Dongguan (CN); Fan Zhao, Shaoguan (CN)

(73) Assignee: Whirlpool Corporation, Benton Harbor, MI (US)

( * ) Notice: Subject to any disclaimer, the term of this patent is extended or adjusted under 35 U.S.C. 154(b) by 470 days.

(21) Appl. No.: 18/002,378

(22) PCT Filed: Jun. 22, 2021

(86) PCT No.: PCT/CN2021/101517
§ 371 (c)(1),
(2) Date: Dec. 19, 2022

(87) PCT Pub. No.: WO2021/259251
PCT Pub. Date: Dec. 30, 2021

(65) Prior Publication Data
US 2023/0225562 A1 Jul. 20, 2023

Related U.S. Application Data

(60) Provisional application No. 63/042,848, filed on Jun. 23, 2020.

(51) Int. Cl.
*A47J 43/07* (2006.01)
*A47J 43/046* (2006.01)
(Continued)

(52) U.S. Cl.
CPC ......... *A47J 43/0716* (2013.01); *A47J 43/046* (2013.01); *A47J 43/0722* (2013.01);
(Continued)

(58) Field of Classification Search
CPC .. A47J 43/0716; A47J 43/046; A47J 43/0722; A47J 43/0727; A47J 43/085; A47J 2043/0738; B02C 18/08
(Continued)

(56) References Cited

U.S. PATENT DOCUMENTS

D959,909 S * 8/2022 Mock .............................. D7/378
D983,595 S * 4/2023 Mock .............................. D7/391
(Continued)

FOREIGN PATENT DOCUMENTS

| CN | 1237883 A | 12/1999 |
| CN | 1373641 A | 10/2002 |

(Continued)

*Primary Examiner* — Jacob K Ackun
(74) *Attorney, Agent, or Firm* — Price Heneveld LLP

(57) ABSTRACT

A storage caddy (12) for storing food processor assembly components includes an upper platform (14) that defines an upper aperture (16), and a lower platform (18) that defines a lower aperture (20). A side wall (22) extends between the upper and lower platforms (14, 18). The side wall (22) includes an interior surface (24) that generally defines an interior receiving space (26) in communication with the upper and lower apertures (16, 20). The side wall (22) further includes an exterior surface (28) opposite the interior surface (24). A retention feature (38) is coupled to the exterior surface (28) of the side wall (22). A guide post (208) extends upward from the upper platform (14).

20 Claims, 7 Drawing Sheets

(51) Int. Cl.
*A47J 43/08* (2006.01)
*B02C 18/08* (2006.01)

(52) U.S. Cl.
CPC ......... *A47J 43/0727* (2013.01); *A47J 43/085* (2013.01); *B02C 18/08* (2013.01); *A47J 2043/0738* (2013.01)

(58) Field of Classification Search
USPC ............................................ 206/320; 99/484
See application file for complete search history.

(56) References Cited

U.S. PATENT DOCUMENTS

| | | |
|---|---|---|
| 2007/0108087 A1 | 5/2007 | Leung |
| 2015/0164279 A1* | 6/2015 | Ryan ........................ A47J 44/02 366/279 |
| 2017/0215647 A1* | 8/2017 | Zakowski ............ A47J 43/0727 |
| 2021/0186267 A1* | 6/2021 | Hammond ............. A47J 43/046 |
| 2021/0212498 A1* | 7/2021 | Sun ........................ A47J 19/025 |
| 2024/0324819 A1* | 10/2024 | McConnell .......... A47J 43/0711 |

FOREIGN PATENT DOCUMENTS

| | | |
|---|---|---|
| CN | 1394125 A | 1/2003 |
| CN | 2686502 Y | 3/2005 |
| CN | 103371743 A | 10/2013 |
| EP | 2941987 A1 | 11/2015 |
| FR | 3069143 A1 | 1/2019 |
| WO | 2013131210 A1 | 9/2013 |

\* cited by examiner

STORAGE CADDY FOR A FOOD PROCESSOR ASSEMBLY

CROSS-REFERENCE TO RELATED APPLICATIONS

This application is a National State Application under 35 U.S.C. § 371 of International Application No. PCT/CN2021/101517, filed on Jun. 22, 2021, entitled "STORAGE CADDY FOR A FOOD PROCESSOR ASSEMBLY," which claims the benefit of U.S. Provisional Application No. 63/042,848, filed on Jun. 23, 2020, entitled "STORAGE CADDY FOR A FOOD PROCESSOR ASSEMBLY," the entire disclosures of which are hereby incorporated herein by reference.

BACKGROUND OF THE DISCLOSURE

The present disclosure generally relates to a food processor assembly, and more specifically, to a storage caddy for a food processor assembly.

SUMMARY OF THE DISCLOSURE

According to one aspect of the present disclosure, a storage caddy for storing food processor assembly components includes an upper platform that defines an upper aperture. A lower platform defines a lower aperture. A side wall extends between the upper and lower platforms. The side wall has an interior surface that generally defines an interior receiving space in communication with the upper and lower apertures and an exterior surface opposite the interior surface. The interior receiving space is configured to receive at least one food processor assembly component for storage therein. Further, a guide post extends upward from the upper platform and is configured for mating engagement with at least one food processor assembly component to maintain the at least one food processor assembly component in a stored position.

According to another aspect of the present disclosure, a storage caddy for storing food processor assembly components includes an upper platform that defines an upper aperture. A lower platform defines a lower aperture. A side wall extends between the upper and lower platforms. The side wall has an interior surface that generally defines an interior receiving space in communication with the upper and lower apertures and an exterior surface opposite the interior surface. The interior receiving space is configured to receive at least one food processor assembly component for storage therein. Further, a retention feature is coupled to the exterior surface of the side wall and is configured for engagement with at least one food processor assembly component to retain the at least one food processor assembly component in a stored position.

According to yet another aspect of the present disclosure, a food processor assembly includes a receptacle configured to receive food for processing therein. The food processor also includes a storage caddy for storing first, second, and third food processor assembly components. The storage caddy includes a body having a side wall that includes an interior surface and an exterior surface opposite the interior surface. The storage caddy also includes an interior receiving space defined by the interior surface of the side wall and configured to receive the first food processor assembly component for storage of the first food processor assembly component. The storage caddy also includes a guide post that extends outward from the body configured for mating engagement with the second food processor assembly component for storage of the second food processor assembly component. The storage caddy further includes a retention feature coupled to the exterior surface of the side wall and configured to be engaged with the third food processor assembly component for storage of the third food processor assembly component. The storage caddy is operable to be stowed, such that at least a portion of the third food processor assembly component engaged with the retention feature is positioned within the receptacle.

These and other features, advantages, and objects of the present disclosure will be further understood and appreciated by those skilled in the art by reference to the following specification, claims, and appended drawings.

Figure 1:
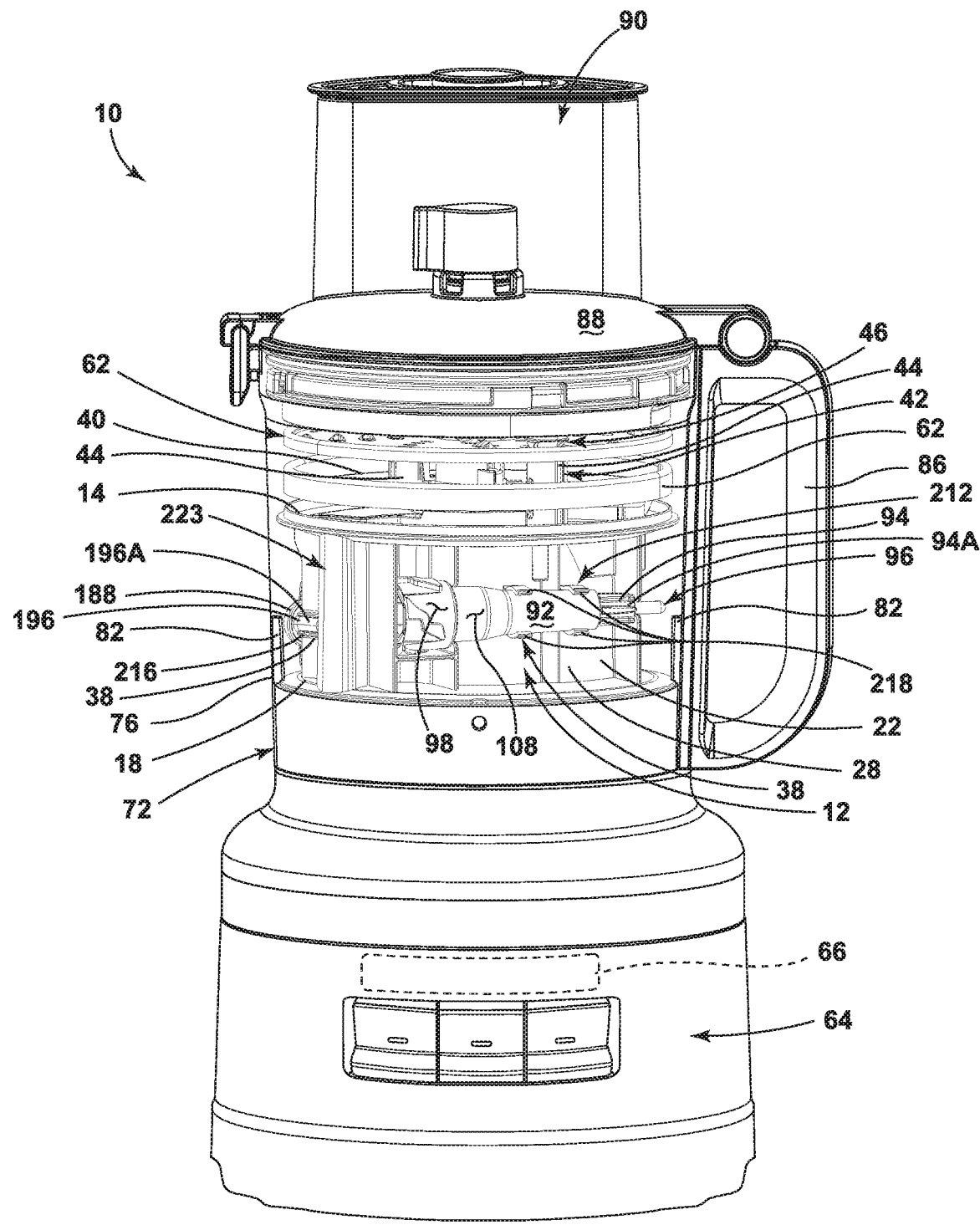
FIG. 1 is a front perspective view of a food processor assembly, illustrating a storage caddy disposed within a receptacle of the food processor assembly, according to one embodiment.

The components in the figures are not necessarily to scale, emphasis instead being placed upon illustrating the principles described herein.

DETAILED DESCRIPTION

The present illustrated embodiments reside primarily in apparatus components related to a storage caddy for a food processor assembly. Accordingly, the apparatus components have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

For purposes of this disclosure, the term "coupled" (in all of its forms: couple, coupling, coupled, etc.) generally means the joining of two components (electrical or mechanical) directly or indirectly to one another. Such joining may be stationary or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-9, reference numeral 10 generally designates a food processor assembly. The food processor assembly 10 includes a plurality of food processor assembly components (e.g., drive adaptor unit 92, blade unit 104, dicing grate cleaning press 188, lid 88, etc.), as described further herein. The food processor assembly 10 includes a storage caddy 12. The storage caddy 12 includes an upper platform 14 that defines an upper aperture 16, and a lower platform 18 that defines a lower aperture 20. At least one side wall 22 extends between the upper and lower platforms 14, 18. The at least one side wall 22 includes at least one interior surface 24 that defines an interior receiving space 26. The interior receiving space 26 is in communication with the upper and lower apertures 16, 20. The at least one side wall 22 includes at least one exterior surface 28 that is opposite the at least one interior surface 24. A lower blade shelf 30 extends outward from at least one interior surface 24 of the at least one side wall 22 into the interior receiving space 26. An upper blade shelf 32 is coupled to at least one of the upper platform 14 and at least one interior surface 24 of the at least one side wall 22. The upper blade shelf 32 is disposed further from the lower platform 18 relative to the lower blade shelf 30. A first magnet 34 is coupled to the upper blade shelf 32. A second magnet 36 is coupled to the lower blade shelf 30.

At least one retention feature 38 is coupled to the at least one exterior surface 28 of the at least one side wall 22. First and second guide posts 40, 42 extend outward from the upper platform 14 away from the lower platform 18. Each of the first and second guide posts 40, 42 includes a first member 44 fixedly coupled to the upper platform 14 and a second member 46 that is movably coupled to the first member 44. The second member 46 is operable to telescopically move relative to the first member 44 between a retracted position and an extended position, wherein the first member 44 is further from the upper platform 14.

The interior receiving space 26 is configured to receive a first blade unit 48 therein via access through the upper aperture 16. The upper and lower blade shelves 32, 30 are configured to respectively support first and second blades 50, 52 of the first blade unit 48. The interior receiving space 26 is configured to receive a second blade unit 54 therein via access through the lower aperture 20. The first and second magnets 34, 36 are configured to respectively apply an attraction force to first and second metal blades 56, 58 of the second blade unit 54 to maintain the second blade unit 54 within the interior receiving space 26. The at least one retention feature 38 is configured for engagement with at least one food processor assembly component to retain the at least one component in a stored position between the upper and lower platforms 14, 18 and outboard of the interior receiving space 26. The first and second guide posts 40, 42 are configured to respectively extend through corresponding receiving apertures 60 defined by at least one processing disc unit 62 of the food processor assembly 10 to maintain the at least one processing disc unit 62 in a stored position.

Referring now to FIG. 1, the food processor assembly 10 includes a base 64 that houses a motor 66 and a control unit (not shown). Under the control of the control unit, the motor 66 drives an output shaft 68 that extends through an upper surface 70 of the base 64. The base 64 also includes one or more buttons, switches, dials, or other types of controls. A user operates the controls to control the operation of the motor 66 and hence the food processor assembly 10. For instance, one of the controls may be operable to turn the motor 66 on and off, while another control may change the speed of the motor 66.

In various implementations, the control unit may comprise analog and/or digital circuitry to process electrical signals received from the motor 66 (or other components of the food processor) and provide electrical control signals to the motor 66 or other components of the food processor assembly 10. For example, the control unit may be embodied as a microcontroller that executes firmware routines to control the operation of the food processor assembly 10.

Figure 2:
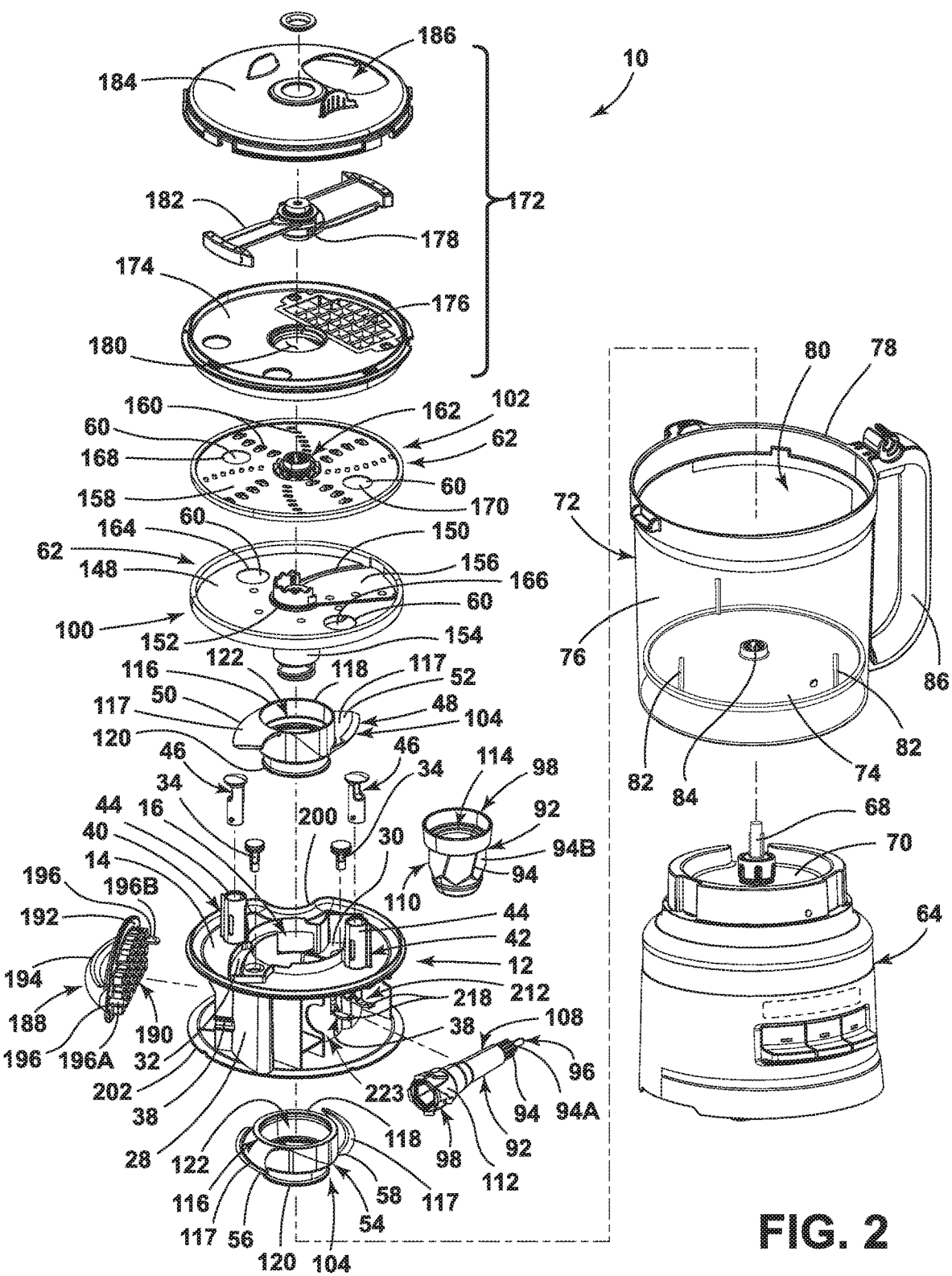
FIG. 2 is a front perspective exploded view of the food processor assembly, according to one embodiment.

Referring now to FIGS. 1 and 2, a receptacle 72 is removably coupled to the base 64. The receptacle 72 includes a floor 74 and a side wall 76 that extends upward from the floor 74 to an upper peripheral edge 78. In the embodiment illustrated in FIG. 1, the side wall 76 extends upward substantially perpendicularly relative to a plane of the floor 74 of the receptacle 72, such that the side wall 76 is substantially cylindrical. An inner surface 80 of the side wall 76 may include one or more fins 82 extending inboard. The fins 82 may act as guides during insertion of the storage caddy 12 into the receptacle 72, as described further herein. An aperture 84 for receiving the output shaft 68 therethrough when the receptacle 72 is coupled to the base 64 is defined by the floor 74 of the receptacle 72.

A handle 86 is coupled to the receptacle 72 and may facilitate placement of the receptacle 72 on the base 64. The receptacle 72 includes a removable lid 88 secured to the upper peripheral edge 78. In the embodiment illustrated in FIG. 1, the lid 88 is pivotally coupled to the handle 86, such that a user may pivot the lid 88 to an open position to gain access to the cavity defined by the receptacle 72. The lid 88 has a feed tube 90 formed thereon through which food items, such as cheeses, meats, fruits, and vegetables are inserted into the receptacle 72 to be processed by the food processor assembly 10. Collectively, the lid 88 and the receptacle 72 define a processing chamber where food items are processed.

The food processor assembly 10 includes a variety of food processor assembly components that are utilized in performing various food-processing tasks. For example, the food processor includes a drive adaptor unit 92 that may be removably coupled to the output shaft 68 protruding through the aperture defined by the floor 74 of the receptacle 72 when the receptacle 72 is coupled to the base 64. A variety of food processing components (e.g., blades, discs, etc.) are configured to attach to the drive adaptor unit 92 such that rotational movement of the output shaft 68 may be relayed to the food processing components via the linking drive adaptor unit 92. The drive adaptor unit 92 may include a plurality of fittings 94 having one or more of a variety of styles and/or sizes configured to correspond with the variety of food processing components that are configured for attachment to the drive adaptor unit 92. For example, in some implementations, the drive adaptor unit 92 may include a first fitting 94A proximate to a distal end 96 of the drive adaptor unit 92 and a second fitting 94B proximate to a proximal end 98 of the drive adaptor unit 92, wherein the first and second fittings 94A, 94B have unique sizes and/or styles. In such embodiments, the first fitting 94A may be configured for engagement with a slicing disc unit 100 and/or a grating disc unit 102, and the second fitting 94B may be configured for engagement with one or more blade units 104, such as a chopping blade unit 54, a dough blade unit 48, and/or a quad blade unit 106.

In the embodiment illustrated in FIG. 2, the drive adaptor unit 92 includes distinct inner and outer members 108, 110 configured to be assembled and disassembled. The inner member 108 is configured to attach to the output shaft 68 and includes the first fitting 94A proximate to the distal end 96 of the inner member 108. As illustrated, a twist-lock style engagement feature 112 that allows for secure assembly of the inner member 108 and the outer member 110 is coupled to the inner member 108 proximate to the proximal end 98 of the inner member 108. The outer member 110 includes an inside surface that defines an aperture 114 extending through the outer member 110 and an outside surface that defines the second fitting 94B of the drive adaptor unit 92. The inside surface includes an engagement feature (not shown) that corresponds with the twist-lock style engagement feature 112 of the inner member 108. In assembly, the inner member 108 extends through the aperture 114 defined by the outer member 110 and the respective engagement features 112 of the inner and outer members 108, 110 correspond. As such, the second fitting 94B is disposed proximate to the proximal end 98 of the assembled drive adaptor unit 92 and the first fitting 94A is disposed proximate to the distal end 96 of the assembled drive adaptor unit 92. In the depicted embodiment, the second fitting 94B of the outer member 110 is larger than the first fitting 94A of the inner member 108. The drive adaptor unit 92 having distinct and separable inner and outer members 108, 110 may allow for more efficient use of space during storage of various food processor components via the storage caddy 12 within the receptacle 72, as described further herein.

Referring now to FIGS. 2 and 7-9, the food processor assembly 10 includes one or more blade units 104. Each of the one or more blade units 104 includes a hub 116 and one or more blades 117 extending outward from the hub 116. The hub 116 may be generally cylindrical in shape having a top side 118, a bottom side 120, and a cavity extending from the bottom side 120 toward the top side 118 or an aperture 122 extending through the top and bottom sides 118, 120 of the hub 116. The cavity or aperture 122 is configured to receive the drive adaptor unit 92 therein to secure the blade unit 104 in a use position via the fitting 94 of the drive adaptor unit 92. In the use position, the top side 118 of the hub 116 is positioned above the bottom side 120 (i.e., relatively further from the base 64 of the food processor assembly 10). In various implementations, the blade unit 104 includes a plurality of blades 117 that extend outward from the hub 116. The plurality of blades 117 may be coupled to portions of the hub 116 such that the respective positions of the blades 117 vary circumferentially and/or in a hub-lengthwise direction (i.e., direction of extension of the hub 116 between the top and bottom sides 118, 120).

Figure 7:
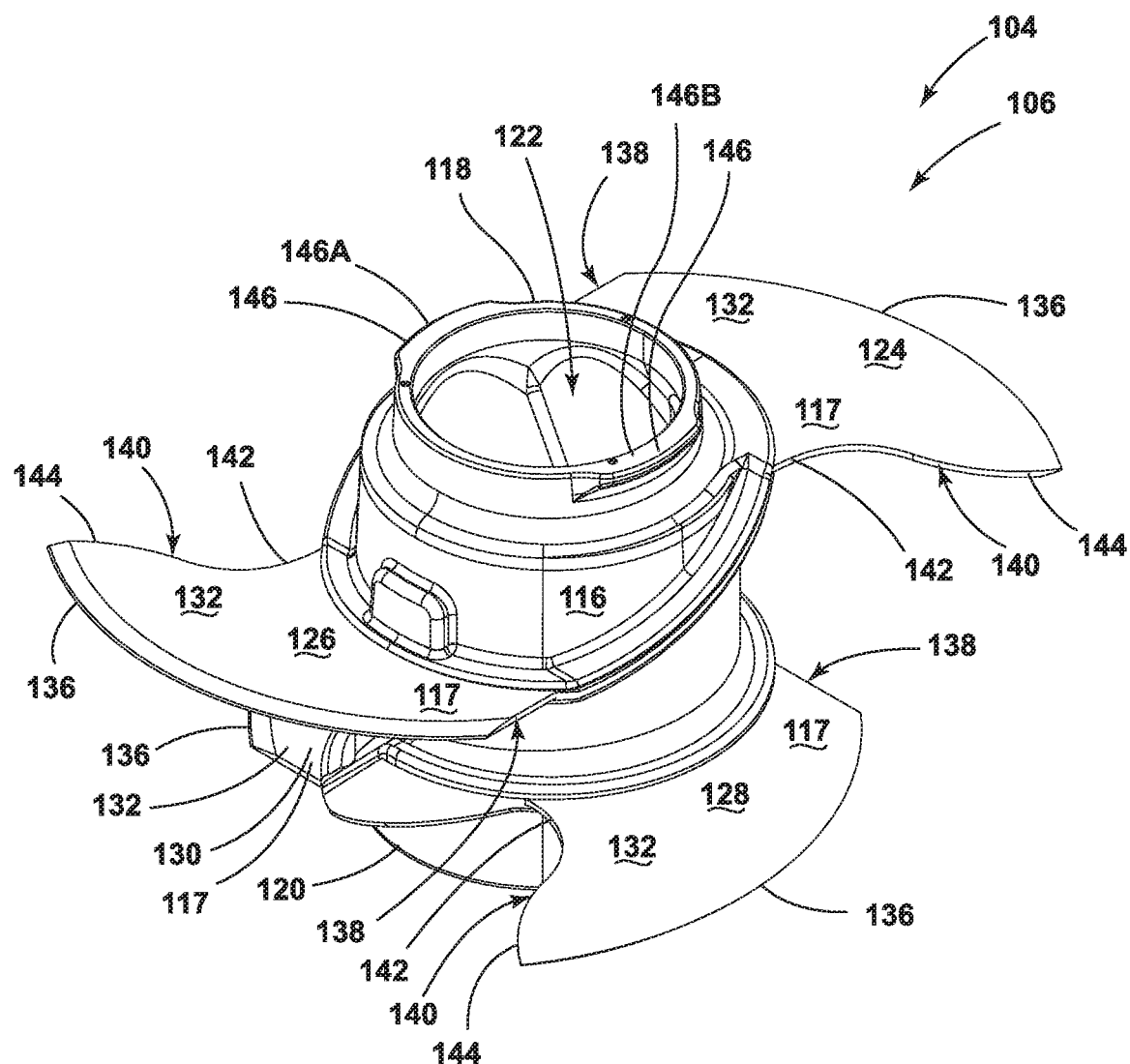
FIG. 7 is a top perspective view of a quad blade unit, according to one embodiment.
Figure 8:
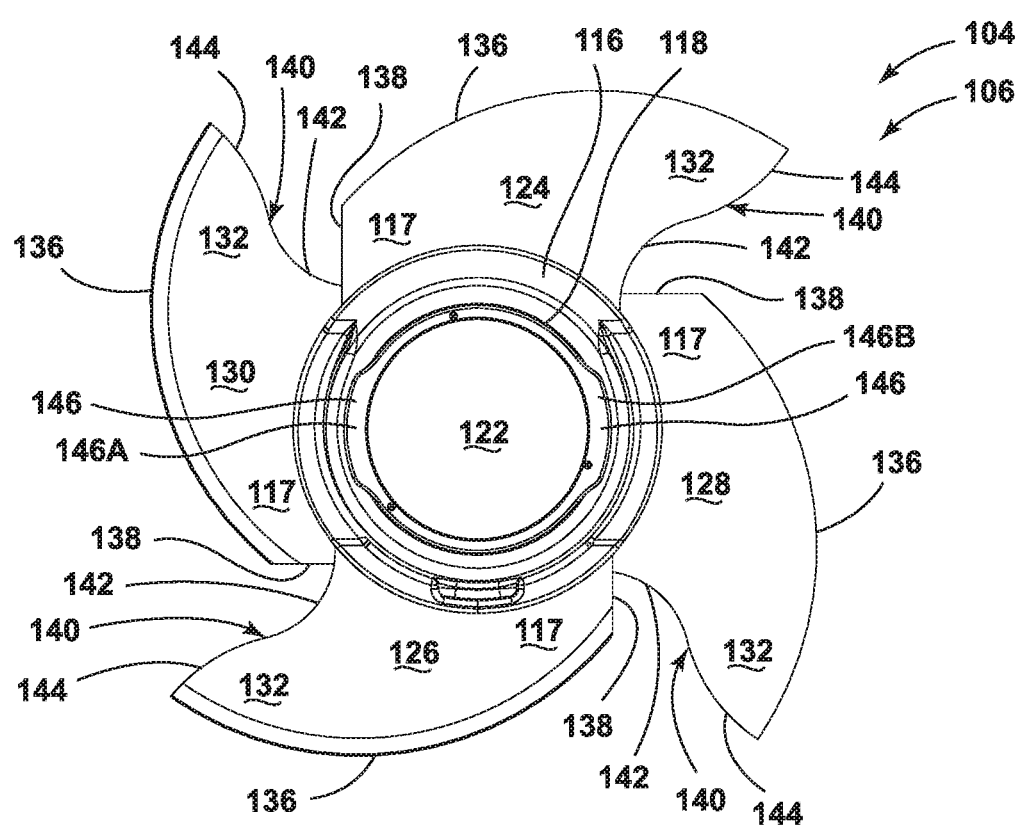
FIG. 8 is a plan view of the quad blade unit, according to one embodiment.
Figure 9:
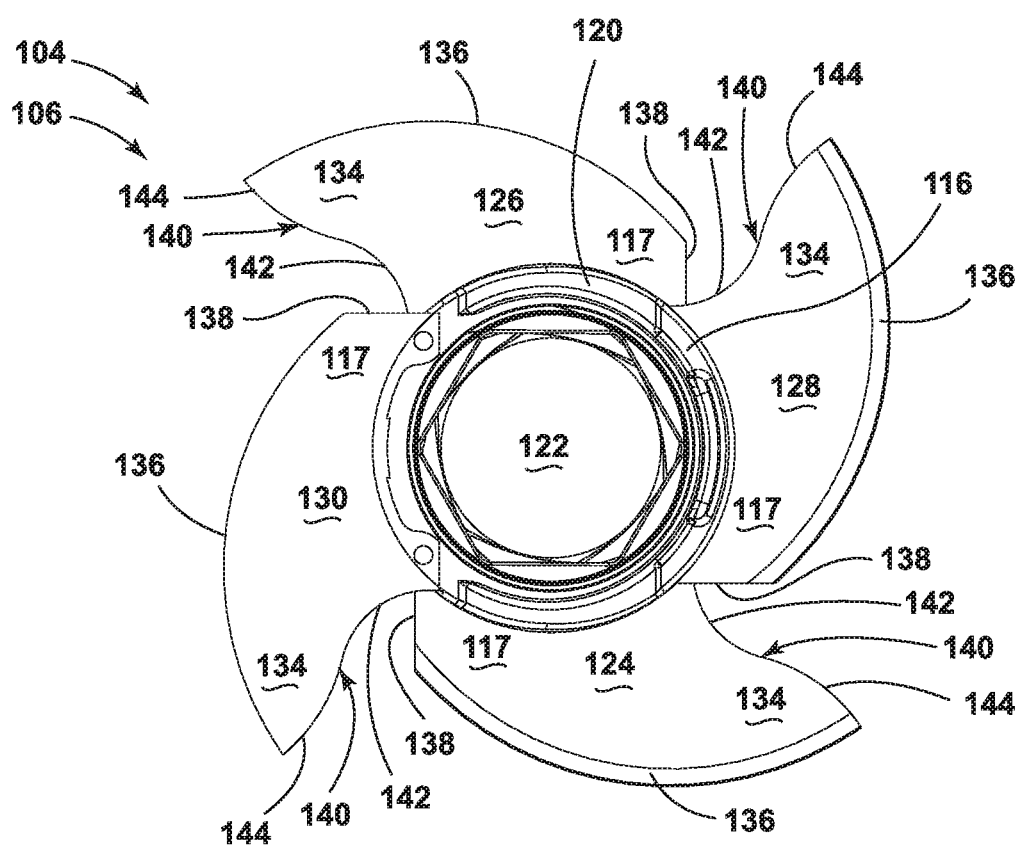
FIG. 9 is a bottom plan view of the quad blade unit, according to one embodiment.

In the embodiment of the blade unit 104 illustrated in FIGS. 7-9, the blade unit 104 includes first, second, third, and fourth blades 124, 126, 128, 130. The first blade 124 is positioned nearest to the top side 118 of the hub 116. The second blade 126 is positioned nearer to the bottom side 120 than the first blade 124 and is positioned circumferentially opposite of the first blade 124. The third blade 128 is positioned nearer to the bottom side 120 than the second blade 126 and is positioned circumferentially between the first and second blades 124, 126. The fourth blade 130 is positioned nearest to the bottom side 120 and is positioned circumferentially opposite the third blade 128 between the first and second blades 124, 126.

Referring still to the embodiment illustrated in FIGS. 7-9, each blade 124, 126, 128, 130 includes a top surface 132 and a bottom surface 134 opposite the top surface 132. The top and bottom surfaces 132, 134 generally converge at a sharpened edge 136. The sharpened edge 136 of each blade 124, 126, 128, 130 is bounded by first and second side surfaces 138, 140 that extend between the top and bottom surfaces 132, 134. As illustrated the first side surface 138 extends outward from the hub 116 in a linear fashion to the sharpened edge 136. The second side surface 140 includes a concavely curved portion 142 that extends outward from the hub 116 to a convexly curved 144 portion that extends further outward to the sharpened edge 136. The sharpened edge 136 arcs from the distal end of the first side surface 138 relative to the hub 116 to the distal end of the second side surface 140 relative to the hub 116, which is further from the hub 116 than the distal end of the first side surface 138.

As illustrated in FIG. 8, from a top side-down perspective, the above-described shape of each blade 124, 126, 128, 130 gives the appearance that the first and second blades 124, 126 together generally form an s-shape. Similarly, the third and fourth blades 128, 130 together generally form the s-shape. As such, the shape and orientation of the first and second blades 124, 126 relative to the hub 116 may be referred to as an s-style blade configuration. In some implementations, the first and second blades 124, 126 may be integrally coupled with each other. In other words, the first and second blades 124, 126 may be a coupled to one another as a single unitary body. The connecting portions of the first and second blades 124, 126 that couple the first and second blades 124, 126 to one another (not shown) may extend through the hub 116. The third and fourth blades 128, 130 may, likewise, be integrally coupled with each other.

Referring to FIGS. 7 and 8, one or more tabs 146 may be coupled to the hub 116 proximate to the top side 118. The one or more tabs 146 may extend outward from the hub 116 to provide a convenient gripping point on the hub 116 for a user to grab. As illustrated in FIG. 8, the hub 116 includes first and second tabs 146A, 146B extending outward from the hub 116 in opposite directions. The tabs 146 are disposed and extend directionally between the first and second blades 124, 126. The shape of the tabs 146 and, particularly, the curved outer edge of each tab 146 that is generally parallel to the radius of the aperture 122 are non-essential design choices that are not tied to the tabs' 146 function, which may be accomplished using tabs 146 of various designs, shapes, and aesthetics.

In the embodiment illustrated in FIG. 2, the dough blade unit 48 and the chopping blade unit 54 are included. The dough blade unit 48 illustrated includes the hub 116 with the aperture 122 extending through the hub 116 from the top side 118 to the bottom side 120. First and second blades 50, 52 extend outward from the hub 116. The first blade 50 is disposed nearest to the top side 118 of the hub 116. The second blade 52 is disposed nearest to the bottom side 120 of the hub 116 and is positioned generally circumferentially opposite of the first blade 50. The blades 50, 52 of the dough blade unit 48 may be plastic and/or some other non-metallic material, in some implementations.

The chopping blade unit 54 illustrated in FIG. 2 includes the hub 116 with the aperture 122 extending through the hub 116 from the top side 118 to the bottom side 120. First and second blades 56, 58 extend outward from the hub 116. The first blade 56 is disposed nearest to the top side 118 of the hub 116. The second blade 58 is disposed nearest to the bottom side 120 of the hub 116 and is positioned generally circumferentially opposite of the first blade 56. In some implementations, the chopping blade unit 54 may include an s-style blade configuration, as described above. The blades 56, 58 of the chopping blade unit 54 may be made of metal. In some embodiments, the metal blades 56, 58 are magnetic. In operation of the food processor assembly 10 the dough blade unit 48 and/or the chopping blade unit 54 may be utilized by attaching the dough blade unit 48 and/or the chopping blade unit 54 to the second fitting 94B of the drive adaptor unit 92, which is coupled to the output shaft 68 and the receptacle 72.

Referring now to FIG. 2, the food processor assembly 10 may include one or more processing disc units 62. In the illustrated embodiment, the food processor assembly 10 includes the slicing disc unit 100 and the grating disc unit 102. The slicing disc unit 100 includes a slicing disc 148 defining a slot 150 and a center aperture 152 in communication with the slot 150, a hub 154 configured to extend through the center aperture 152, and a slicing blade 156 coupled to the hub 154. The hub 154 is operable to move into and out of the center aperture 152 of the slicing disc 148, such that the distance between the slicing blade 156 and the slot 150 may be adjusted to allow for food slices of varying thicknesses. In operation of the food processor assembly 10, the slicing disc unit 100 may be utilized by attaching the slicing disc unit 100 to the drive adaptor unit 92 via engagement of the hub 154 with the first fitting 94A.

The grating disc unit 102 includes a grating disc 158 that defines a plurality of grating apertures 160 configured to grate food processed by food processor assembly 10. The grating disc unit 102 further includes a hub 162 positioned generally at the radial center of the grating disc 158. In operation of the food processor assembly 10, the grating disc unit 102 may be utilized by attaching the grating disc unit 102 to the drive adaptor unit 92 via engagement of the hub 162 with the first fitting 94A.

In various implementations, the one or more processing disc units 62 may define at least one receiving aperture 60 configured to receive at least one guide post 208 of the storage caddy 12 in mating engagement. For example, in the embodiment illustrated in FIG. 2, the slicing disc 148 of the slicing disc unit 100 defines first and second receiving apertures 164, 166 configured to respectively receive first and second guide posts 40, 42 therein. Likewise, the grating disc 158 of the grating disc unit 102 defines first and second receiving apertures 168, 170 configured to respectively receive the first and second guide posts 40, 42 therein.

In some implementations, the food processor assembly 10 includes a dicing unit 172. For example, as illustrated in FIG. 2, the dicing unit 172 includes a base plate 174 having a dicing grate 176 coupled thereto, a hub 178 configured to correspond with a substantially radially centered aperture 180 defined by the base plate 174, a dicing blade 182 coupled to the hub 178 and a cover piece 184 that defines an opening 186. In an assembled condition, the cover piece 184 is engaged with the base plate 174 such that the opening 186 aligns with the dicing grate 176, and the dicing blade 182 is disposed between the cover piece 184 and the base plate 174. In operation of the food processor assembly 10, the dicing unit 172 may be utilized by attaching hub 178 to the drive adaptor unit 92 via the first fitting 94A.

As shown in FIG. 2, in some implementations, the food processor assembly 10 may include a dicing grate cleaning press 188. The press 188 may include a plurality of protrusions 190 that extend outward from a face 192 of the press 188. The plurality of protrusions 190 are configured to correspond with spaces defined by the dicing grate 176. As illustrated, the press 188 includes a press handle 194 coupled to the press 188 opposite the face 192. The press 188 may include one or more attachment features 196 configured to engage with one or more retention features 38 of the storage caddy 12, as described further herein. In the embodiment depicted in FIG. 2, the press 188 includes first and second attachment features 196A, 196B embodied as pegs extending outward from the face 192 of the press 188. The illustrated pegs extend outward from the face 192 of the press 188 further than the plurality of protrusions 190 and the plurality of protrusions 190 are positioned between the pegs.

Figure 3:
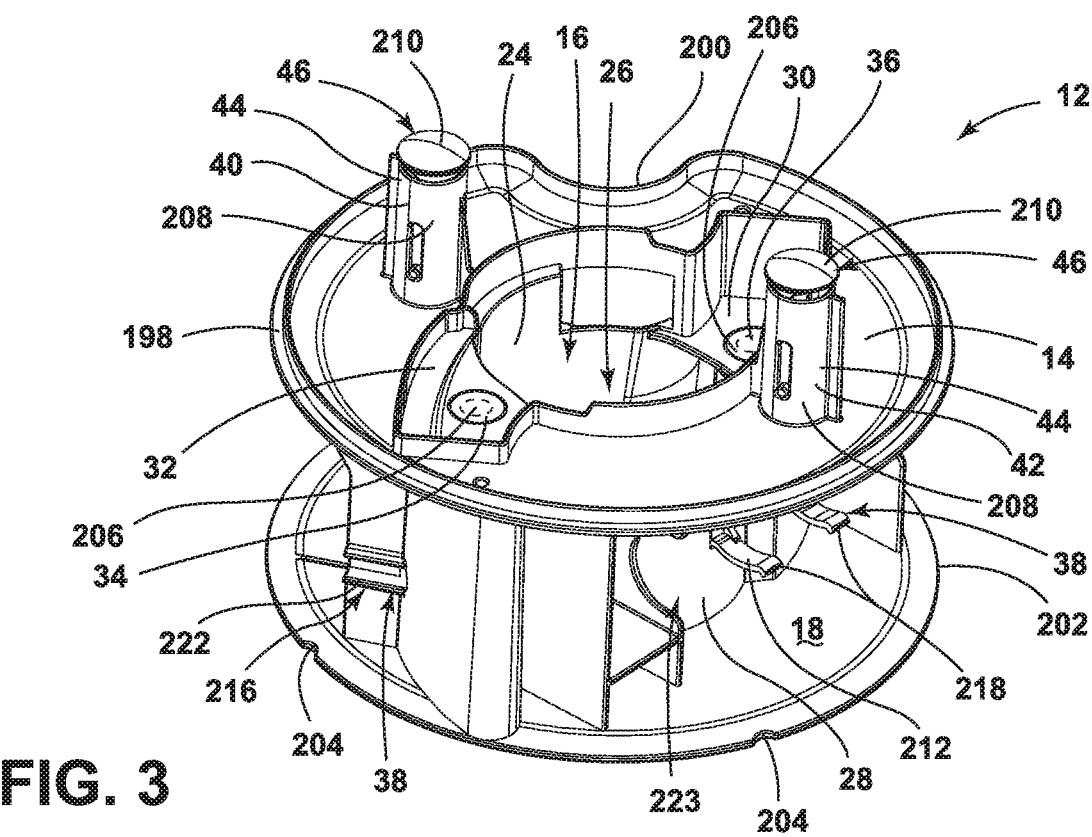
FIG. 3 is a top perspective view of the storage caddy, illustrating first and second guide posts having first members and second members telescopically retracted within the first members, according to one embodiment.
Figure 4:
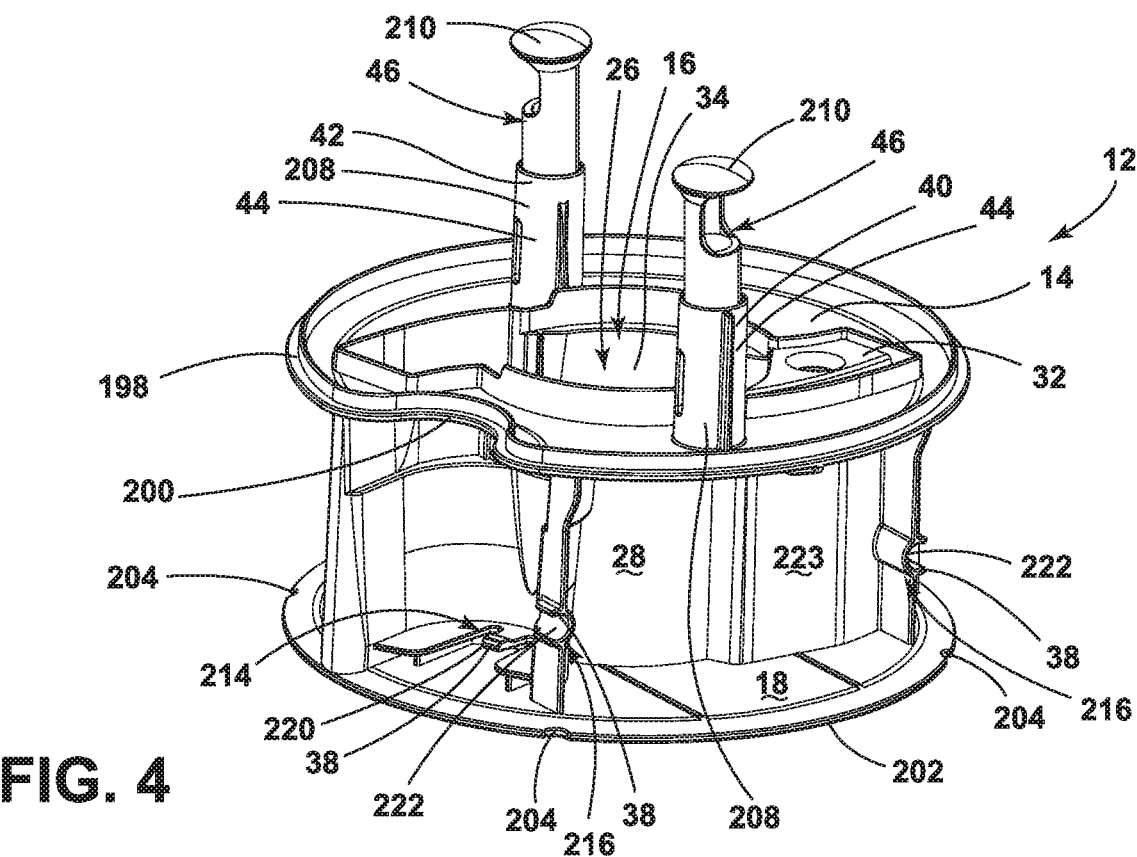
FIG. 4 is a side perspective view of the storage caddy, illustrating the first and second guide posts having first members and second members telescopically extended out of the first members, according to one embodiment.

Referring now to FIGS. 2-6, the storage caddy 12 is illustrated. The storage caddy 12 includes the upper platform 14. The upper platform 14 is bounded by a peripheral rim 198. As illustrated in FIGS. 3 and 4, the peripheral rim 198 may extend upward relative to the plane of the upper platform 14 disposed inboard of the peripheral rim 198. In the illustrated embodiment, the outline of the peripheral rim 198 is generally circular with a concave swoop 200 curving upper-platform-inboard. Various outline shapes of the peripheral rim 198 are contemplated.

The storage caddy 12 further includes the lower platform 18. A plane of the lower platform 18 may be parallel to the plane of the upper platform 14. The lower platform 18 includes a peripheral rim 202. In the embodiment illustrated in FIGS. 2-5, the peripheral rim 202 has a generally circular outline that includes a plurality of recesses 204. The plurality of recesses 204 are configured to correspond with the one or more fins 82 extending inboard from the inner surface 80 of the side wall 22 of the receptacle 72, such that the desired orientation of the storage caddy 12 within the receptacle 72 may be facilitated via alignment of the one or more fins 82 with the plurality of recesses 204. In various implementations, the peripheral rim 202 of the lower platform 18 may include more, fewer, or no recesses. Further, various peripheral rim 202 outline shapes are contemplated.

Figure 5:
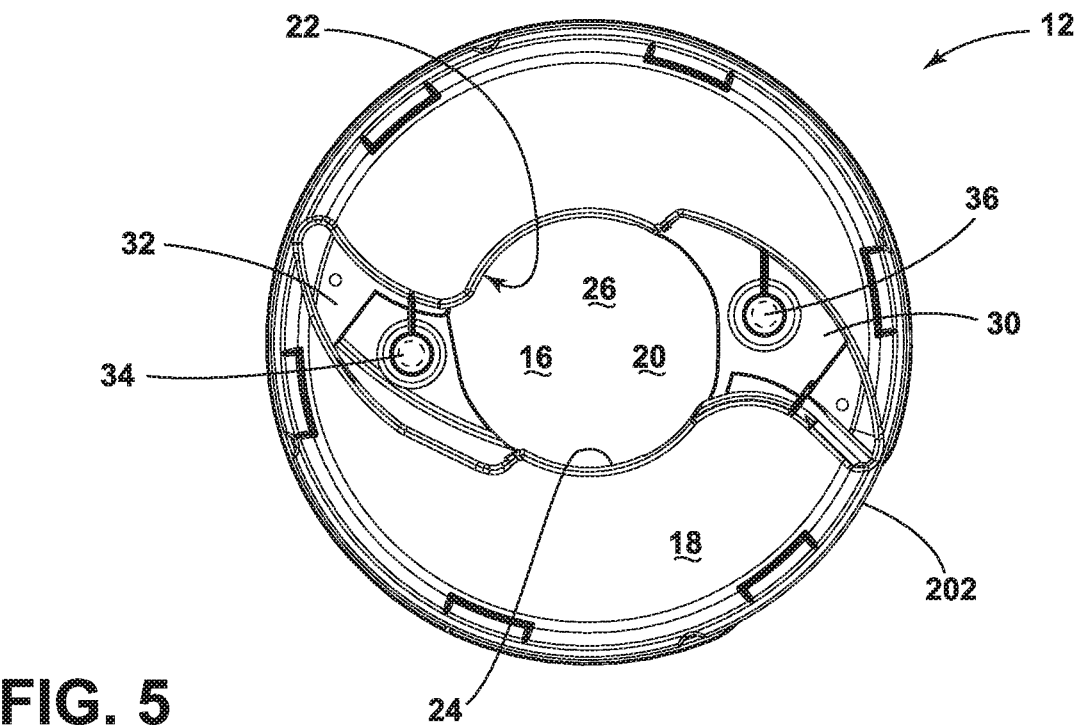
FIG. 5 is a bottom plan view of the storage caddy, according to one embodiment.
Figure 6:
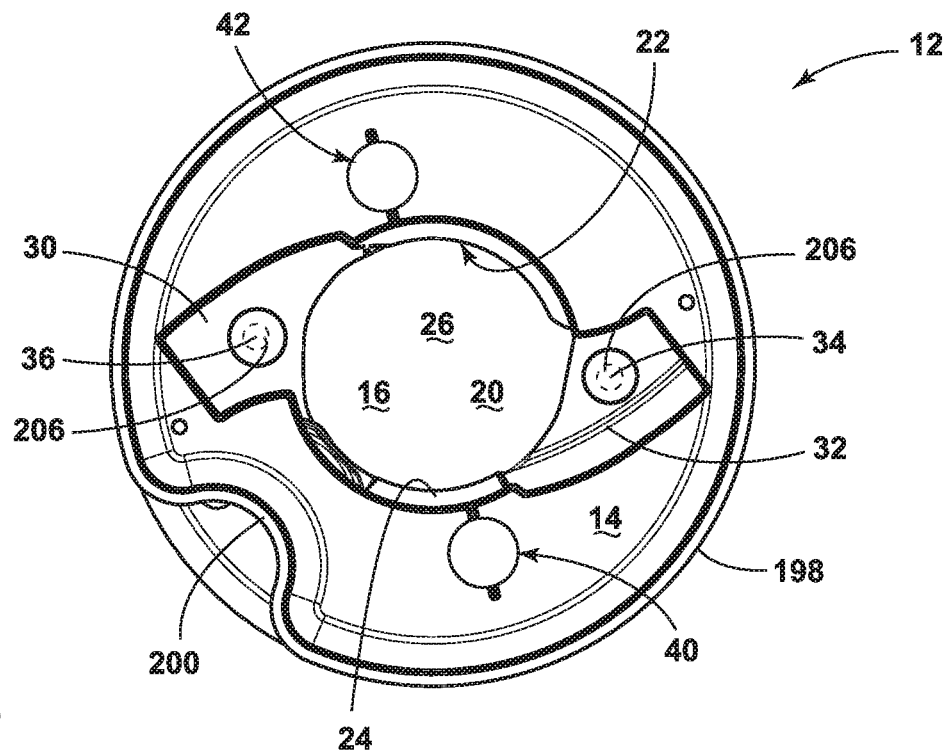
FIG. 6 is a plan view of the storage caddy, according to one embodiment.

As illustrated in FIGS. 2-4, one or more side walls 22 extend between the upper and lower platforms 14, 18. The one or more side walls 22 include one or more interior surfaces 24 that face generally storage caddy-inboard and one or more exterior surfaces 28 that face generally storage caddy-outboard opposite the one or more interior surfaces 24. The one or more interior surfaces 24 define an interior receiving space 26. As illustrated in FIG. 5, the interior receiving space 26 is in communication with the upper aperture 16 and the lower aperture 20. In other words, the storage caddy 12 defines an uninterrupted opening that extends from the upper aperture 16 through the interior receiving space 26 to the lower aperture 20.

Referring still to FIGS. 2-6, the storage caddy 12 includes an upper blade shelf 32 and a lower blade shelf 30. The upper blade shelf 32 extends outward from at least one of the upper platform 14 and one or more interior surfaces 24 of the one or more side walls 22. The lower blade shelf 30 extends outward from the one or more interior surfaces 24 of the one or more side walls 22 into the interior receiving space 26. The lower blade shelf 30 is disposed nearer to lower platform 18 than the upper blade shelf 32. In other words, the upper blade shelf 32 is disposed further from the lower platform 18 relative to the lower blade shelf 30. One or more magnets 206 may be coupled to the upper blade shelf 32 and/or the lower blade shelf 30. For example, as illustrated in FIGS. 2, 3, 5, and 6, the first magnet 34 is coupled to the upper blade shelf 32 and the second magnet 36 is coupled to the lower blade shelf 30.

In various implementations, the interior receiving space 26 of the storage caddy 12 is configured to receive one or more food processor assembly components for storage therein. In some implementations, the interior receiving space 26 is configured to receive one or more blade units 104. For example, as illustrated in FIG. 2, the interior receiving space 26 is configured to receive the dough blade unit 48 and the chopping blade unit 54 therein. The interior receiving space 26 is configured to receive the dough blade unit 48 via access through the upper aperture 16 of the upper platform 14. The lower and upper blade shelves 30, 32 of the storage caddy 12 are configured to respectively support the first and second blades 50, 52 of the dough blade unit 48, such that the dough blade unit 48 rests within the interior receiving space 26.

As further illustrated in FIG. 2, the interior receiving space 26 is configured to receive the chopping blade unit 54 therein via access through the lower aperture 20 of the lower platform 18. The first and second metal blades 56, 58 of the chopping blade unit 54 are configured to respectively be attracted to the first and second magnets 34, 36 coupled to the upper and lower blade shelves 32, 30, respectively. The attraction between the first and second magnets 34, 36 and the first and second metal blades 56, 58, respectively, is configured to maintain the chopping blade unit 54 within the interior receiving space 26 below (i.e., nearer to the lower platform 18 than the dough blade unit 48). It is contemplated that a variety of other food processor assembly components may be stowed within the interior receiving space 26, in some implementations.

Referring now to FIGS. 2-4 and 6, one or more guide posts 208 of the storage caddy 12 are illustrated. The one or more guide posts 208 may extend upward from the upper platform 14 away from the lower platform 18. For example, as illustrated in FIGS. 2-4, first and second guide posts 40, 42 extend upward from the upper platform 14. In the illustrated embodiment, the first and second guide posts 40, 42 each include the first member 44 that is fixedly coupled to the upper platform 14 and the second member 46 that is movably coupled to the first member 44. The second member 46 is configured to telescopically move relative to the first member 44 between a retracted position and an extended position, wherein the first member 44 is further from the upper platform 14. A variety of types of guide posts 208 are contemplated. For example, in some embodiments, the guide posts 208 may include a single component fixedly coupled to the upper platform 14. In the embodiment illustrated in FIGS. 3 and 4, the second members 46 of the first and second guide posts 40, 42 include heads 210 coupled to ends of the first and second guide posts 40, 42 that are distal from the upper platform 14.

In operation, the one or more guide posts 208 may be configured for mating engagement with one or more receiving apertures 60 defined by one or more food processor assembly components, such that the food processor assembly components may be maintained in a stored position via the engagement. For example, in various implementations, one or more slicing disc units 100 include one or more receiving apertures 60 configured to be matingly engaged via the one or more guide posts 208. In the embodiment illustrated in FIG. 2, the slicing disc 148 of the slicing disc unit 100 includes first and second receiving apertures 164, 166, and the grating disc 158 of the grating disc unit 102 includes first and second receiving apertures 168, 170. The first and second receiving apertures 168, 170 of the grating disc 158 and the first and second receiving apertures 164, 166 of the slicing disc 148 are configured for mating engagement with the first and second guide posts 40, 42 coupled to the upper platform 14. Thus, the grating disc unit 102 and the slicing disc unit 100 may be securely stored atop the upper platform 14 via the mating engagement of the guide posts 40, 42 with the corresponding receiving apertures 164, 166, 168, 170.

Referring now to FIGS. 2-4, the storage caddy 12 includes one or more retention features 38. The one or more retention features 38 are coupled to one or more of the exterior surfaces 28 of the one or more side walls 22 of the storage caddy 12. The one or more retention features 38 are configured for engagement with one or more food processor assembly components to retain the one or more components in stored positions. In various implementations, the one or more components are retained by the one or more retention features 38 in stored positions between the upper and lower platforms 14, 18 and outboard of the interior receiving space 26.

In various implementations, the one or more retention features 38 may include one or more of a variety of types of features configured to engage with one or more components of the food processor assembly 10 (e.g., snap-fit, threaded connectors, magnets, interlocking male engagement features, hook and loop fasteners, corresponding mating features, twist-lock assemblies, etc.). Further, the one or more retention features 38 may be configured to become engaged with a variety of types of food processor assembly components. For example, in the embodiment illustrated in FIGS. 2-4, the storage caddy 12 includes a first retention feature 212 configured to engage with the inner member 108 of the drive adapter unit 92, a second retention feature 214 configured to engage with the outer member 110 of the drive adapter unit 92, and a third retention feature 216 configured to engage with the dicing grate cleaning press 188.

The first retention feature 212 includes a plurality of resilient arms 218 configured to act as a snap fit feature for yieldingly retaining the inner member 108 of the drive adapter unit 92 in the stored position, as illustrated in FIG. 1. The second retention feature 214, shown in FIG. 4, includes a barb 220 coupled to the exterior surface 28 of the side wall 22 proximate to the lower platform 18 that is configured to hold the outer member 110 of the drive adapter unit 92 in contact with the exterior surface 28 of the side wall 22 to maintain the outer member 110 in the stored position. The third retention feature 216 includes first and second receiving wells 222 configured to receive the first and second attachment features 196A, 196B embodied as pegs coupled to the face 192 of the press 188.

In various implementations, the portions of the storage caddy 12 that the one or more retention features 38 and/or the one or more guide posts 208 are coupled to may be referred to as the body 223 of the storage caddy 12. For example, in some implementations, the body 223 may include the upper platform 14, the lower platform 18, and the one or more side walls 22 extending therebetween. It is contemplated that the body 223 may include additional or fewer storage caddy 12 portions than the embodiments of the storage caddy 12 disclosed herein. For example, in some implementations, the body 223 may not include the lower platform 18.

As set forth herein, the components of the food processor assembly 10 may be stored within the receptacle 72 as follows. The chopping blade unit 54 may be stored within the interior receiving space 26. The dough blade unit 48 may be stored within the interior receiving space 26 above the chopping blade unit 54. The drive adapter unit 92 may be disassembled, such that the inner member 108 may be engaged by the first retention feature 212 and the outer member 110 may be engaged by the second retention feature 214. The dicing grate cleaning press 188 may be engaged with the third retention feature 216. The slicing disc unit 100 may be stored on top of the upper platform 14 with the first and second guide posts 40, 42 extending through the first and second receiving apertures 164, 166 of the slicing disc 148. The grating disc unit 102 may be disposed above the slicing disc unit 100 with the first and second guide posts 40, 42 extending through the first and second receiving apertures 168, 170 of the grating disc 158. The dicing unit 172 may be disposed above the grating disc unit 102 and may rest upon the heads 210 of the first and second guide posts 40, 42, which may cause the second member 46 to move from the extended position to the retracted position within the first member 44 of the guide posts 40, 42. When configured in this way, the storage caddy 12 may then be placed into the receptacle 72 of the food processor assembly 10. The fins 82 extending inboard from the inner surface 80 of the receptacle 72 may correspond with the recesses 204 defined by the peripheral rim 202 of the lower platform 18 to guide the movement of the storage caddy 12 into the receptacle 72. Upon positioning the storage caddy 12 within the receptacle 72, the lid 88 may be pivoted to a closed position, as shown in FIG. 1.

In various embodiments, the storage caddy 12 may be operable to store first, second, and third food processor assembly components. The storage caddy 12 may store the first food processor assembly component by receiving the first food processor assembly component within the interior receiving space 26 defined by the interior surface 24 of the side wall 22 of the body 223 of the storage caddy 12. The storage caddy 12 may store the second food processor assembly component via mating engagement of the guide post 208 extending outward from the body 223 with the second food processor assembly component. The storage caddy 12 may store the third food processor assembly component by engaging the third food processor assembly component with the retention feature 38 that is coupled to the exterior surface 28 of the side wall 22 of the body 223. Further, the storage caddy 12 may be operable to be stowed, such that at least a portion of the third food processor assembly component that is engaged with the retention feature 38 is positioned within the receptacle 72 of the food processor assembly 10.

In one embodiment, the first food processor assembly component is the chopping blade unit 54 that is configured to be stored in the interior receiving space 26, the second food processor assembly component is the slicing disc unit 100 configured to be stored in mating engagement with the guide post 208, and the third food processor assembly component is the inner member 108 of the drive adaptor unit 92, which is configured to be engaged by the first retention feature 212 that is coupled to the exterior surface 28 of the side wall 22 of the body 223. Further, as illustrated in FIG. 1, the storage caddy 12 is operable to be stowed, such that at least a portion of the third food processor assembly component (i.e., at least a portion of the inner member 108 of the drive adaptor unit 92) is positioned within the receptacle 72 of the food processor assembly 10. A variety of embodiments are contemplated, wherein various food processor assembly components may comprise the first, second, and third food processor assembly components.

Various aspects of the present disclosure may provide a variety of advantages. First, storage caddy 12 being designed to receive and engage with various food processor assembly components may aid in organizing the components of food processor assembly 10 so that a user may access and store the components conveniently and intuitively. Second, the storage caddy 12 being designed to store various components of the food processor assembly 10 within the interior receiving space 26, outboard of the interior receiving space 26 and between the upper and lower platforms 14, 18, and atop the upper platform 14 via mating engagement of the first and second guide posts 40, 42 allows the storage caddy 12 and attached food processor assembly components to be conveniently stowed within the cavity defined by the receptacle 72.

According to one aspect of the present disclosure, a storage caddy for storing food processor assembly components includes an upper platform that defines an upper aperture. A lower platform defines a lower aperture. A side wall extends between the upper and lower platforms. The side wall has an interior surface that generally defines an interior receiving space in communication with the upper and lower apertures and an exterior surface opposite the interior surface. The interior receiving space is configured to receive at least one food processor assembly component for storage therein. Further, a guide post extends upward from the upper platform and is configured for mating engagement with at least one food processor assembly component to maintain the at least one food processor assembly component in a stored position.

According to another aspect, a retention feature is coupled to the exterior surface of the side wall and configured for engagement with at least one food processor assembly component to retain the at least one food processor assembly component in a stored position.

According to another aspect, the retention feature is configured for engagement with the at least one food processor assembly component to retain the at least one food processor assembly component in the stored position between the upper and lower platforms.

According to another aspect, the guide post includes a first member fixedly coupled to the upper platform and a second member movably coupled to the first member and operable to move relative to the first member between a retracted position and an extended position. The second member is further from the upper platform.

According to another aspect, the second member of the guide post is operable to telescopically move relative to the first member between the retracted and extended positions.

According to another aspect, a lower blade shelf extends outward from the interior surface of the side wall into the interior receiving space, and an upper blade shelf is coupled to at least one of the upper platform and the interior surface of the side wall. The upper blade shelf is disposed further than the lower blade shelf from the lower platform.

According to another aspect, at least one magnet is coupled to at least one of the upper blade shelf and the lower blade shelf. The interior receiving space is configured to receive a first blade unit therein via access through the upper aperture and the upper and lower blade shelves are configured to respectively support first and second blades of the first blade unit. The interior receiving space is configured to receive a second blade unit therein via access through the lower aperture, and the at least one magnet is configured to apply an attraction force to at least one metallic blade of the second blade unit to maintain the second blade unit within the interior receiving space.

According to another aspect of the present disclosure, a storage caddy for storing food processor assembly components includes an upper platform that defines an upper aperture. A lower platform defines a lower aperture. A side wall extends between the upper and lower platforms. The side wall has an interior surface that generally defines an interior receiving space in communication with the upper and lower apertures and an exterior surface opposite the interior surface. The interior receiving space is configured to receive at least one food processor assembly component for storage therein. Further, a retention feature is coupled to the exterior surface of the side wall and is configured for engagement with at least one food processor assembly component to retain the at least one food processor assembly component in a stored position.

According to another aspect, the retention feature is configured for engagement with the at least one food processor assembly component to retain the at least one food processor assembly component in the stored position between the upper and lower platforms.

According to another aspect, a guide post extends upward from the upper platform and is configured for mating engagement with at least one food processor assembly component to maintain the at least one food processor assembly component in a stored position.

According to another aspect, the guide post includes a first member fixedly coupled to the upper platform and a second member movably coupled to the first member and operable to move relative to the first member between a retracted position and an extended position, wherein the second member is further from the upper platform.

According to another aspect, the second member of the guide post is operable to telescopically move relative to the first member between the retracted and extended positions.

According to another aspect, a lower blade shelf extends outward from the interior surface of the side wall into the interior receiving space. An upper blade shelf is coupled to at least one of the upper platform and the interior surface of the side wall. The upper blade shelf is disposed further than the lower blade shelf from the lower platform.

According to another aspect, at least one magnet is coupled to at least one of the upper blade shelf and the lower blade shelf. The interior receiving space is configured to receive a first blade unit therein via access through the upper aperture and the upper and lower blade shelves are configured to respectively support first and second blades of the first blade unit. The interior receiving space is configured to receive a second blade unit therein via access through the lower aperture, and the at least one magnet is configured to apply an attraction force to at least one metallic blade of the second blade unit to maintain the second blade unit within the interior receiving space.

According to yet another aspect of the present disclosure, a food processor assembly includes a receptacle configured to receive food for processing therein. The food processor also includes a storage caddy for storing first, second, and third food processor assembly components. The storage caddy includes a body having a side wall that includes an interior surface and an exterior surface opposite the interior surface. The storage caddy also includes an interior receiving space defined by the interior surface of the side wall and configured to receive the first food processor assembly component for storage of the first food processor assembly component. The storage caddy also includes a guide post that extends outward from the body configured for mating engagement with the second food processor assembly component for storage of the second food processor assembly component. The storage caddy further includes a retention feature coupled to the exterior surface of the side wall and configured to be engaged with the third food processor assembly component for storage of the third food processor assembly component. The storage caddy is operable to be stowed, such that at least a portion of the third food processor assembly component engaged with the retention feature is positioned within the receptacle.

According to another aspect, the body includes an upper platform and a lower platform, and the side wall extends between the upper and lower platforms.

According to another aspect, the guide post extends outward from the upper platform of the body.

According to another aspect, the storage caddy is operable to be stowed, such that at least a portion of the third food processor assembly component is engaged with the retention feature and such that the storage caddy is positioned within the receptacle.

According to another aspect, the third food processor assembly component is configured to be engaged with the retention feature via a snap fit engagement.

According to another aspect, the third food processor assembly component is a drive adaptor unit.

According to another aspect, the guide post includes a first member fixedly coupled to the upper platform and a second member movably coupled to the first member and operable to move relative to the first member between a retracted position and an extended position. The second member is further from the upper platform.

According to another aspect, the second member of the guide post is operable to telescopically move relative to the first member between the retracted and extended positions.

According to another aspect, the storage caddy includes a lower blade shelf that extends outward from the interior surface of the side wall into the interior receiving space. An upper blade shelf is coupled to at least one of the upper platform and the interior surface of the side wall. Further, the upper blade shelf is disposed further than the lower blade shelf from the lower platform.

According to another aspect, at least one magnet is coupled to at least one of the upper blade shelf and the lower blade shelf. The first food processor assembly component is a first blade unit, the interior receiving space is configured to receive the first blade unit therein via access through an upper aperture, and the upper and lower blade shelves are configured to respectively support first and second blades of the first blade unit. The interior receiving space is configured to receive a second blade unit therein via access through a lower aperture. Further, the at least one magnet is configured to apply an attraction force to at least one metallic blade of the second blade unit to maintain the second blade unit within the interior receiving space.

According to another aspect, the second food processor assembly component is a processing disc unit.

According to another aspect, the processing disc unit is a slicing disc unit.

According to another aspect, the guide post is configured for mating engagement with the slicing disc unit and a grating disc unit for storage of the slicing disc unit and the grating disc unit.

According to another aspect, the storage caddy is operable to be stowed, such that the third food processor assembly component engaged with the retention feature is positioned wholly within the receptacle.

According to another aspect, the storage caddy is operable to be stowed, such that the first, second, and third food processor assembly components coupled to the storage caddy are positioned wholly within the receptacle.

It will be understood by one having ordinary skill in the art that construction of the described disclosure and other components is not limited to any specific material. Other exemplary embodiments of the disclosure disclosed herein may be formed from a wide variety of materials, unless described otherwise herein.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A storage caddy for storing food processor assembly components, comprising:
    an upper platform that defines an upper aperture;
    a lower platform that defines a lower aperture;
    a side wall that extends between the upper and lower platforms, the side wall having an interior surface that generally defines an interior receiving space in communication with the upper and lower apertures and an exterior surface opposite the interior surface, wherein the interior receiving space is configured to receive at least one food processor assembly component for storage therein; and
    a guide post that extends upward from the upper platform and is configured for mating engagement with at least one food processor assembly component to maintain the at least one food processor assembly component in a stored position.

2. The storage caddy of claim 1, further comprising:
    a retention feature coupled to the exterior surface of the side wall and configured for engagement with at least one food processor assembly component to retain the at least one component in a stored position.

3. The storage caddy of claim 2, wherein the retention feature is configured for engagement with the at least one food processor assembly component to retain the at least one food processor assembly component in the stored position between the upper and lower platforms.

4. The storage caddy of claim 1, wherein the guide post includes a first member fixedly coupled to the upper platform and a second member movably coupled to the first member and operable to move relative to the first member between a retracted position and an extended position, wherein the second member is further from the upper platform.

5. The storage caddy of claim 4, wherein the second member of the guide post is operable to telescopically move relative to the first member between the retracted and extended positions.

6. The storage caddy of claim 1, further comprising:
    a lower blade shelf that extends outward from the interior surface of the side wall into the interior receiving space; and
    an upper blade shelf coupled to at least one of the upper platform and the interior surface of the side wall, wherein the upper blade shelf is disposed further than the lower blade shelf from the lower platform.

7. The storage caddy of claim 6, further comprising:
    at least one magnet that is coupled to at least one of the upper blade shelf and the lower blade shelf, wherein the interior receiving space is configured to receive a first blade unit therein via access through the upper aperture and the upper and lower blade shelves are configured to respectively support first and second blades of the first blade unit, the interior receiving space is configured to receive a second blade unit therein via access through the lower aperture, and the at least one magnet is configured to apply an attraction force to at least one metallic blade of the second blade unit to maintain the second blade unit within the interior receiving space.

8. A storage caddy for storing food processor assembly components, comprising:
an upper platform that defines an upper aperture;
a lower platform that defines a lower aperture;
a side wall that extends between the upper and lower platforms, the side wall having an interior surface that generally defines an interior receiving space in communication with the upper and lower apertures and an exterior surface opposite the interior surface, wherein the interior receiving space is configured to receive at least one food processor assembly component for storage therein; and
a retention feature coupled to the exterior surface of the side wall and configured for engagement with at least one food processor assembly component to retain the at least one food processor assembly component in a stored position.

9. The storage caddy of claim 8, wherein the retention feature is configured for engagement with the at least one food processor assembly component to retain the at least one food processor assembly component in the stored position between the upper and lower platforms.

10. The storage caddy of claim 8, further comprising:
a guide post that extends upward from the upper platform and is configured for mating engagement with at least one food processor assembly component to maintain the at least one food processor assembly component in a stored position.

11. The storage caddy of claim 10, wherein the guide post includes a first member fixedly coupled to the upper platform and a second member movably coupled to the first member and operable to move relative to the first member between a retracted position and an extended position, wherein the second member is further from the upper platform.

12. The storage caddy of claim 11, wherein the second member of the guide post is operable to telescopically move relative to the first member between the retracted and extended positions.

13. The storage caddy of claim 8, further comprising:
a lower blade shelf that extends outward from the interior surface of the side wall into the interior receiving space; and
an upper blade shelf coupled to at least one of the upper platform and the interior surface of the side wall, wherein the upper blade shelf is disposed further than the lower blade shelf from the lower platform.

14. The storage caddy of claim 13, further comprising:
at least one magnet that is coupled to at least one of the upper blade shelf and the lower blade shelf, wherein the interior receiving space is configured to receive a first blade unit therein via access through the upper aperture and the upper and lower blade shelves are configured to respectively support first and second blades of the first blade unit, the interior receiving space is configured to receive a second blade unit therein via access through the lower aperture, and the at least one magnet is configured to apply an attraction force to at least one metallic blade of the second blade unit to maintain the second blade unit within the interior receiving space.

15. A food processor assembly, comprising:
a receptacle configured to receive food for processing therein; and
a storage caddy for storing first, second, and third food processor assembly components, the storage caddy comprising:
a body having a side wall that includes an interior surface and an exterior surface opposite the interior surface;
an interior receiving space defined by the interior surface of the side wall and configured to receive the first food processor assembly component for storage of the first food processor assembly component;
a guide post that extends outward from the body configured for mating engagement with the second food processor assembly component for storage of the second food processor assembly component; and
a retention feature coupled to the exterior surface of the side wall and configured to be engaged with the third food processor assembly component for storage of the third food processor assembly component, wherein the storage caddy is operable to be stowed, such that at least a portion of the third food processor assembly component is positioned within the receptacle.

16. The food processor assembly of claim 15, wherein the body includes an upper platform and a lower platform, and the side wall extends between the upper and lower platforms.

17. The food processor assembly of claim 16, wherein the guide post extends outward from the upper platform of the body.

18. The food processor assembly of claim 15, wherein the storage caddy is operable to be stowed, such that at least a portion of the third food processor assembly component is engaged with the retention feature and such that the storage caddy is positioned within the receptacle.

19. The food processor assembly of claim 15, wherein the third food processor assembly component is configured to be engaged with the retention feature via a snap fit engagement.

20. The food processor assembly of claim 19, wherein the third food processor assembly component is a drive adaptor unit.

* * * * *